Figure 1:
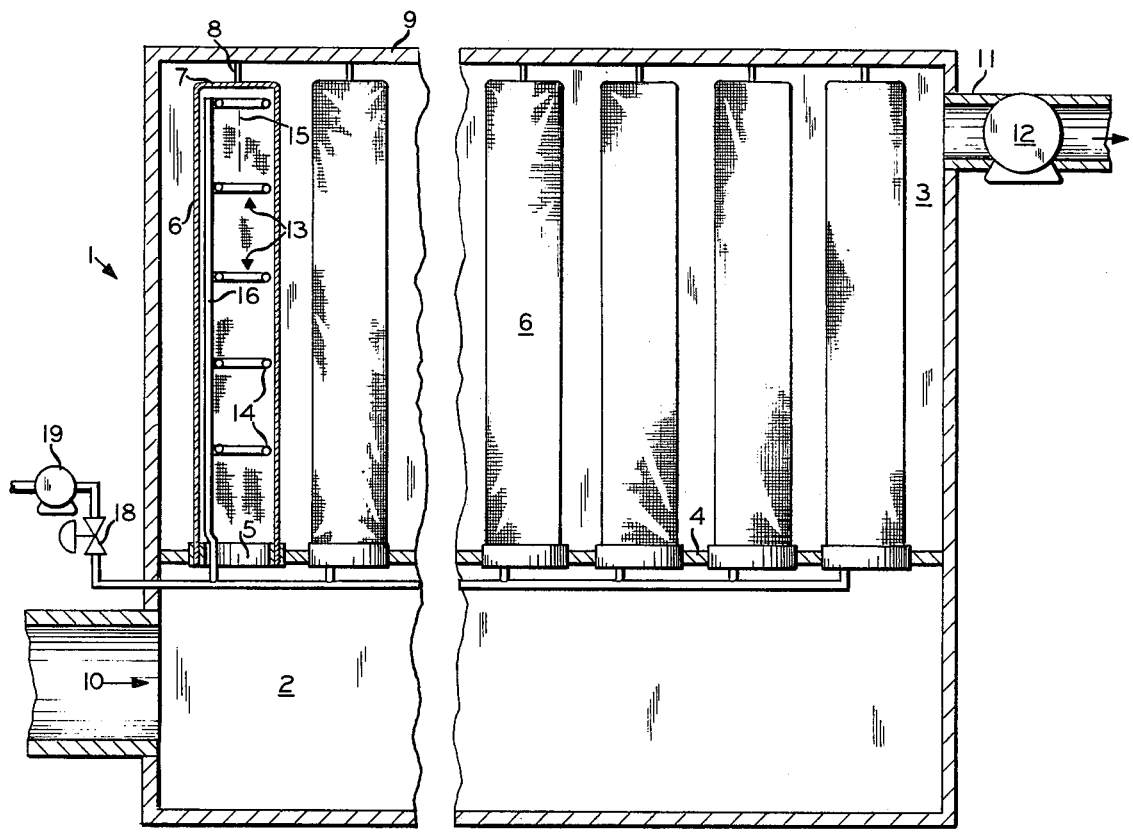

United States Patent [19]

Cheng

[11] 4,058,379

[45] Nov. 15, 1977

[54] FILTERING APPARATUS

[75] Inventor: Paul J. Cheng, Bartlesville, Okla.

[73] Assignee: Phillips Petroleum Company, Bartlesville, Okla.

[21] Appl. No.: 581,340

[22] Filed: May 27, 1975

[51] Int. Cl.² .......................................... B01D 46/04
[52] U.S. Cl. ............................... 55/302; 55/341 NT; 55/379; 55/431; 55/492; 55/501
[58] Field of Search ................ 55/96, 288, 282, 291, 55/293, 294, 301, 302, 304, 341, 379, 431, 492, 500, 501

[56] References Cited

U.S. PATENT DOCUMENTS

| | | | |
|---|---|---|---|
| 1,321,490 | 11/1919 | Sweetland | 55/294 |
| 1,329,115 | 1/1920 | Evans | 55/282 X |
| 1,498,061 | 6/1924 | Adams | 55/294 |
| 1,944,268 | 1/1934 | Rathbun | 55/324 |
| 2,788,860 | 4/1957 | Turner | 55/294 X |
| 2,796,146 | 6/1957 | Hersey, Jr. et al. | 55/294 |
| 2,889,048 | 6/1959 | Nordin | 55/301 X |
| 3,053,030 | 9/1962 | Smith | 55/288 X |
| 3,095,289 | 6/1963 | Egan | 55/96 X |
| 3,146,080 | 8/1964 | Ruble et al. | 55/96 |
| 3,176,449 | 4/1965 | Schultz et al. | 55/294 |
| 3,178,868 | 4/1965 | Gibby | 55/293 X |
| 3,256,679 | 6/1966 | Snyder | 55/96 X |
| 3,268,296 | 8/1966 | Hall et al. | 423/210 |
| 3,325,979 | 6/1967 | Smith | 55/304 X |
| 3,339,347 | 9/1967 | Otto, Jr. | 55/379 X |
| 3,429,107 | 2/1969 | Graves | 55/378 |
| 3,471,024 | 10/1969 | Doucet | 55/96 X |
| 3,473,300 | 10/1969 | Wilm et al. | 55/96 |
| 3,520,109 | 7/1970 | Caskey | 55/96 |
| 3,521,428 | 7/1970 | Dollinger et al. | 55/96 |
| 3,543,481 | 12/1970 | Pausch | 55/96 |
| 3,623,910 | 11/1971 | Calhoun et al. | 134/34 |
| 3,685,257 | 8/1972 | Burke | 55/96 |
| 3,716,968 | 2/1973 | Mischke | 55/294 |
| 3,816,977 | 6/1974 | Gordon et al. | 55/96 |
| 3,816,979 | 6/1974 | Wales | 55/341 X |
| 3,838,555 | 10/1974 | Kubiak | 55/96 |
| 3,853,506 | 12/1974 | Pircon | 55/96 X |

OTHER PUBLICATIONS

Perry, R. H. and C. H. Chilton, Chemical Engineer's Handbook, 5th Ed., McGraw-Hill Book Co., New York, 1973, pp.289-295.

Primary Examiner—Frank W. Lutter
Assistant Examiner—Kathleen J. Prunner

[57] ABSTRACT

A method and apparatus for filtering solids from a gas stream is disclosed wherein the flow of the gas stream through a filter medium is stopped after a filter cake has built up consisting of the solid particles having been filtered out of the gas stream, wherein a plurality of cleaning gas streams is generated that sweep and remove the filter cake built upon the filter medium. The cleaning gas streams are emitted from pipes which also function to support the filter medium.

7 Claims, 7 Drawing Figures

FILTERING APPARATUS

This invention relates to a filtering process. In one of its more specific aspects, this invention relates to filtering a gas stream containing solid particles. Still more specifically, this invention relates to filtering carbon black-containing smoke and removing the filter cake formed from the filter bag. Further, this invention relates to the filtering apparatus for carrying out the filtering process of the invention.

BACKGROUND OF THE INVENTION

In every filtering process the problem exists that as the products removed from a stream by a filter build up a layer on the filter medium the efficiency of the filter is reduced more and more. This problem has proven to be particularly significant in the field of carbon black production. In this technology the stream of smoke or carbon black-containing gas is passed through filters and carbon black forms a relatively compact cake on the filter. Currently this carbon black cake is removed by shutting off the flow of the smoke and backflushing the filter, for instance with filter off-gas from another filtering unit which is on filtering cycle. However, this backflushing technology is not as sufficiently effective as desired.

Other technology has been developed in order to sufficiently remove the material filtered from a stream and accumulated on the filter surface. Thus, for instance, in the field of carbon black collection, the filter bags were subjected to a mechanical treatment such as beating in order to remove carbon black cake from the surface. This treatment created problems, particularly as far as the time of use of the filters was concerned, because the mechanical treatment was quite damaging to the filter medium and oftentimes reduced the period of use of the filter medium.

THE INVENTION

It is thus an object of this invention to provide a new filtering process.

Another object of this invention is to provide a new process for removing the solid particles from a gas stream by filtering it and for removing the filter cake building up on the filter medium during the filtration step.

Still a further object of this invention is to provide a filtering process for filtering carbon black from carbon black-containing gas streams.

Another object of this invention is to provide a process for filtering gas streams and removing the filtered material from the filter medium and thereby increasing the capacity of the filter medium.

Still another object of this invention is to provide a new filter system or apparatus for carrying out the filtering process of this invention.

Another object of this invention is to provide a filtering apparatus with which the filter cake on the filter medium is effectively removed.

Figure 2:
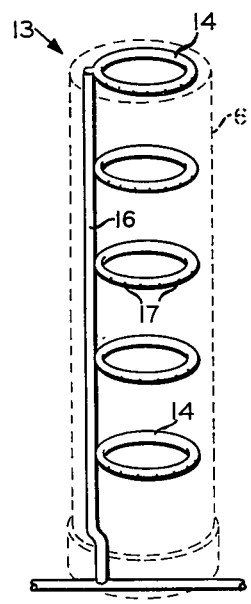
Figure 3:
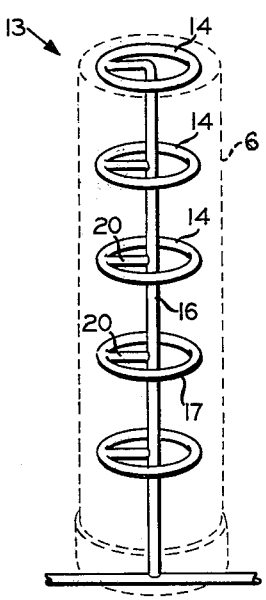
Figure 4:
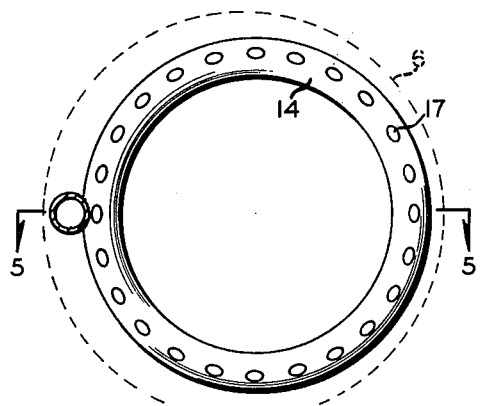
Figure 5:
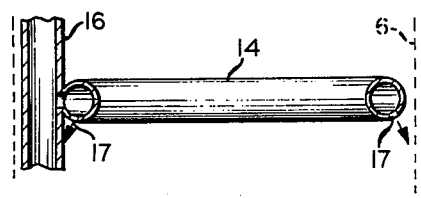

These and other objects, advantages, embodiments and details of this invention will become apparent to those skilled in the art from the following detailed description of the invention, the appended claims and the drawing of which FIG. 1 shows a schematical view of a filter house, FIGS. 2 and 3 show embodiments of a filter unit contained in the filter house shown in FIG. 1, FIGS. 4 and 5 show one embodiment of a ring nozzle element employed in the filter system shown in FIGS. 1 and 2, and FIGS. 6 and 7 show another embodiment of such a ring element.

In accordance with this invention, a process for filtering a gas stream containing solid particles is provided which comprises passing said gas stream containing the solid particles through a filter medium while depositing said solid particles on said filter medium to form a filter cake, stopping the flow of the gas stream, generating a plurality of cleaning gas streams at a plurality of locations proximate to the filter medium at the side of the filter cake and in directions towards and along the filter medium such as to remove the filter cake from the filter medium by a sweeping action of these cleaning gas streams, collecting the removed filter cake and stopping the cleaning gas streams.

It has been found that, for instance, the backflushing of a filter medium does not effectively separate the filter cake from the interface of the filter but simply produces numerous small channels through the filter cake. These channels rapidly fill up again when the next cycle of filtering the gas stream containing the solid particles is carried out. On the contrary, by the present invention the plurality of cleaning gas streams effectively remove substantially all the filter cake from the filter surface thus rendering the filter medium approximately as effective as during its next filtration cycle.

In accordance with the first embodiment of this invention, the filter comprises an elongated filter bag as said filter medium, one end of said bag constituting the inlet for a gas stream containing the solid particles, the other end of said bag being closed, a plurality of ring-shaped pipes arranged within said filter bag, the axis of the rings and the axis of the bag being essentially coextensive, at least one nozzle opening in each of these ring-shaped pipes, said nozzle openings being located, arranged and shaped such as to direct gas streams essentially sweeping along the inner surface of the filter bag, the source of compressed gas or fluid (e.g., filter off-gas) connected to said ring-shaped pipe via at least one valve and wherein said stream of gas containing the solid particles entering the filter bag is shut off when the filter cake has formed, wherein said valve is or said valves are thereafter opened thus connecting said ring-shaped pipes with said source of compressed fluid and generating a plurality of gas streams sweeping along the inside of the filter bag and sweeping the filter cake from the bag's internal surface, wherein the filter cake is collected and wherein the valve is thereafter closed.

This embodiment of the invention has considerable advantage in using a very simple mechanical construction. Furthermore, the ring-shaped pipes have the double function of constituting the source for the stream of cleaning gas and of being a support for the filter bag which prevents the filter bag from collapsing during, for instance, a step of backflowing a gas stream in opposite direction to the stream of gas containing the solid particles through the filter in order to even more effectively remove the filter cake from the back surface.

It is presently preferred to arrange the filter bag with its axis essentially vertical and its inlet opening at the lower end of the bag and to arrange the nozzle opening on the lower side of the ring-shaped pipes such as to generate gas streams of gas sweeping along the bag wall in essentially downward direction. In this embodiment the cleaning gas streams not only remove the filter cake from the filter bag wall but also serve as a means of transportation for this filter cake towards the location of collection of the filter cake.

In accordance with a presently preferred embodiment of this invention, a carbon black-containing smoke is passed through said filter medium building up a carbon black cake on the filter, and the cleaning gas streams are selected from the group of streams consisting essentially of steam, flue gas, nitrogen, air or mixtures thereof. The efficiency of carbon black filters is particularly increased by the present invention.

The speed of the gas for the removal of the filter cake can vary in broad ranges. In the case of carbon black cakes to be removed from filter bags this speed is preferably in the range of about 20 to about 100 ft/sec.

In accordance with another preferred embodiment of this invention, the process described is carried out with glass fiber filter bags.

In accordance with still a further embodiment of this invention, there is provided a filter system for filtering a gas stream containing solid particles, which filter system comprises a first conduit for said gas stream containing solid particles, a second conduit for filtered gas connected to the first conduit via a porous filter medium that is pervious for the gas but essentially impervious to the solid particles, a plurality of means for generating sweeping gas streams for sweeping the filter surface facing the first conduit, said means having outlets distributed over that surface of the filter medium that is in contact with the gas stream containing the solid particles and further comprising a source of compressed sweeping gas in fluid communication via at least one valve with said outlets.

In accordance with a presently preferred embodiment of the filter system, the filter medium is a filter bag closed at one end and open at the other end, and said means for generating the sweeping gas streams comprise ring-shaped pipes having at least one nozzle opening per ring, said openings being shaped and arranged such as to direct sweeping gas streams along the inner surface of the filter bag, the rings being arranged essentially coaxial with the cylindrical filter bag and being connected and communicating via at least one valve with said source of compressed sweeping gas. The external diameter of these rings and the internal diameter of the filter bag are approximately the same so that the rings constituting the sources of the sweeping gas streams also support the filter bag and prevent its collapsing while a stream of backflow gas is flushed from the outside of the filter bag to the inside thereof.

Further embodiments of this invention will become apparent from the description of the drawing showing presently preferred details of a filter system useful in the recovery of the carbon black from carbon black-containing smoke.

FIG. 1 schematically shows a portion of a filter house 1 partially in cross section. This filter house consists essentially of two portions, a smoke inlet portion 2 and a clean gas portion 3. The two smoke house portions 2 and 3 are separated by a wall 4. The wall 4 contains several openings 5 which communicate with the lower opening of essentially cylindrically shaped filter bags 6. The top closure 7 of these filter bags 6 is connected via hanging means 8, e.g., a hook and a spring, to the upper wall 9 of the filter house 1. The filter bags 6 generally are under a certain mechanical tension. The filter bags 6 are attached in a fluid-tight manner to the dividing wall 4 so that carbon black-containing gas entering the smoke portion 2 is driven only through the essentially cylindrically shaped filter bags into the clean gas section 3 leaving the carbon black on the inside of the filter bags 6. The inlet conduit 10 is connected to a not shown carbon black reactor producing the quenched carbon black-containing smoke. The clean gas section 3 is connected via an outlet conduit 11 and an optional blower 12 to any further processing units for this gas, e.g., to a flare, to fuel, etc., in which any entrained carbon black which has escaped through the filter bag is burned.

The unique feature of this invention now consists in a sweeping and supporting unit 13 (FIGS. 2 and 3). This unit 13 is only shown for the left filter bag in FIG. 1; it is, however, to be understood that a similar unit is present in each of the following filter bags 6. Each unit 13 consists essentially of a plurality of rings 14, the axis 15 of which is coextensive with the cylindrical axis of the filter bag not shown in the drawing. Each of these rings 14 consists of a hollow pipe which is supported to, connected, and in fluid communication with a pipe 16 arranged parallel to the longitudinal axis of the filter bag 6 in proximity to the interior surface of this filter bag. The rings 14, which are also shown in FIGS. 2, 4 and in cross section in FIG. 5, are provided with a plurality of holes 17 the direction of which holes is slightly inclined towards the filter bag 6 as shown in FIGS. 5 and 7.

The pipe 16 connecting the rings 14 belonging to one filter bag is further connected via a valve 18 to a source of compressed sweeping gas, e.g., a compressor 19. Since the filter bags 6 and carbon black filter houses are operated in four to twelve sections, each section having about 500 filter bags, it is preferred to connect the pipes 16 which are in one such group in parallel with one valve 18 to the source of compressed gas. Thus, it is possible to shut down one of these units and to continue the operation of the rest of the units.

Figure 6:
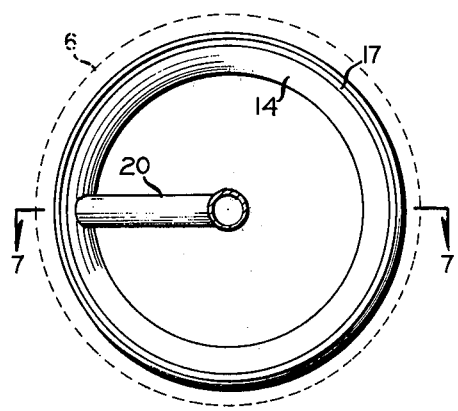
Figure 7:
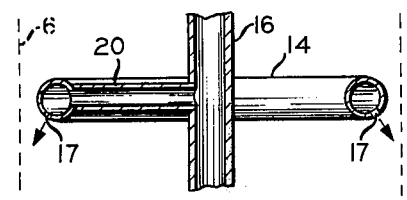

Another embodiment of the suspension and sweeping ring arrangement is schematically shown in a perspective view in FIG. 3 and in cross section in FIGS. 6 and 7. The filter bag surrounding these rings is indicated in dotted line 6. In this embodiment the rings 14 are each connected to a radial pipe 20 which in turn is connected with a pipe 16 arranged essentially coextensive with the axis of the filter bag 6. Thus, the interior of all the ring pipes 14 communicate via the radial pipes 20 with the axial pipe 16. This pipe 16 is in turn connected via a valve to a source of compressed gas (both not shown in FIG. 3).

Instead of arranging a plurality of holes 17 in the rings 14, it is also possible to arrange one continuous ring slot 17 having the same center as the ring 14. This embodiment is schematically shown in FIGS. 6 and 7.

In order to still more fully explain the invention, typical calculated operating data are given in the following table:

TABLE

| Filter System | |
|---|---|
| Diameter of the filter bag, inches | 5 |
| Length of the filter bag, inches | 168 |
| Axial ring jet spacing, inches | 28 |
| Number of holes per ring | 15 |
| Diameter of the holes, inches | 0.125 |
| Operating Data | |
| Bag tension, lbs. | 30 |
| Filter phase, seconds | 220 |
| Backflush phase, seconds | 10 |
| Repressuring phase, seconds | 10 |
| Backflush Fluid | steam |
| Rate of flow per ring, cu. ft./min. | 3.8 |

TABLE-continued

| Velocity of backflush fluid leaving the holes, ft./sec. | 50 |
| --- | --- |

The filter bag consists of glass fiber material. The rings effectively prevent the filter bag from collasping during the repressuring phase.

It has to be understood that in addition to jetting a cleaning gas stream against and along the inside of the filter bag, the filter bag can also be backflushed from the clean gas portion of the filter house, e.g., by pressurizing this portion of the house. Such a flow of cleaning gas through a filter bag in opposite direction to the flow of the gas being filtered additionally helps remove the filter cake or carbon black cake from the filter walls.

When only the filtering phase and repressuring phase are used absent the plurality of cleaning streams as hereinbefore described, the capacity of the bag expressed as actual cubic feet of smoke per square foot of bag surface per minute is 1.1. Employing the invention the capacity is 1.7 actual cubic feet per square foot of bag surface per minute. This improvement means a gain in capacity of about 55%.

Reasonable variations and modifications which will be apparent to those skilled in the art can be made in this invention without departing from the spirit and scope thereof.

I claim:

1. A filter system for filtering a solids-containing gas stream, comprising
   a. a filter housing,
   b. wall means so disposed within said filter housing as to form a gas inlet portion and a clean gas outlet portion, said wall means having at least one opening therein between said gas inlet portion and said clean gas outlet portion, with said opening being adapted to receive the open first end of an elongated cylindrical filter bag;
   c. first conduit means to introduce said solids-containing gas into said gas inlet portion;
   d. second conduit means to remove a solids-free gas from said clean gas outlet portion;
   e. said elongated cylindrical filter bag disposed in said clean gas outlet portion in association with said opening in said wall means, said elongated cylindrical filter bag having said open first end in a fluid-tight relationship with said opening and a closed second end;
   f. third conduit means disposed within said elongated cylindrical filter bag and having the axis thereof parallel to the axis of said elongated cylindrical filter bag;
   g. a plurality of ring-shaped pipe means in fluid communication with said third conduit means, each of said ring-shaped pipe means having at least one opening therein and being so adapted as to direct a flow of cleaning gas so as to sweep along the inner surface of said elongated cylindrical filter bag, and wherein the external ring diameter of said ring-shaped pipe means is essentially the same as the internal diameter of said elongated cylindrical filter bag so that said ring-shaped pipe means, in addition to providing a means for directing said flow of cleaning gas along the inner surface of said elongated cylindrical filter bag, also supports said elongated cylindrical filter bag;
   h. fourth conduit means in communication with said third conduit means and a source of said cleaning gas; and
   i. valve means in said fourth conduit means to regulate flow of said cleaning gas from said source of said cleaning gas through said third and fourth conduits and each of said plurality of ring-shaped pipes.

2. A filter system according to claim 1 wherein there are a plurality of openings in said wall means and a plurality of elongated cylindrical filter bags disposed in said clean gas outlet portion of said filter housing and a plurality of third conduit means, one each of which being disposed in each of said elongated cylindrical filter bags and each of which is in fluid communication with said fourth conduit means.

3. A filter system according to claim 2 wherein said opening in each of said ring-shaped pipe means is in the form of a continuous ring-shaped opening.

4. A filter system according to claim 1 wherein each of said ring-shaped pipe means is connected to and in fluid communication with a radial pipe extending radially inwardly toward the center of the respective ring-shaped pipe means and said third conduit means.

5. A filter system according to claim 1 wherein each of said ring-shaped pipe means has a plurality of openings therein.

6. A filter system according to claim 5 wherein said openings are arranged equidistant on each of said ring-shaped pipe means.

7. A filter system according to claim 1 wherein said elongated cylindrical filter bag consists essentially of a glass fiber material.

* * * * *